United States Patent [19]

Vaughan

[11] Patent Number: 5,266,795
[45] Date of Patent: Nov. 30, 1993

[54] WIDE-ANGLE IMAGING SYSTEM WITH FIBEROPTIC COMPONENTS PROVIDING ANGLE-DEPENDENT VIRTUAL MATERIAL STOPS

[75] Inventor: Arthur H. Vaughan, Sierra Madre, Calif.

[73] Assignee: The United States of America as represented by the Administrator of the National Aeronautics and Space Administration, Washington, D.C.

[21] Appl. No.: 786,618

[22] Filed: Nov. 1, 1991

[51] Int. Cl.[5] .................................. H01J 5/16
[52] U.S. Cl. .......................... 250/227.2; 359/896
[58] Field of Search ............ 250/203.3, 203.4, 203.6, 250/206.1, 206.2, 221, 227.20; 359/896

[56] References Cited

U.S. PATENT DOCUMENTS

| | | | |
|---|---|---|---|
| 1,085,611 | 2/1914 | Humbrecht | 359/402 |
| 3,142,235 | 7/1964 | Siegmund | 354/150 |
| 3,229,105 | 1/1966 | Mestwerdt et al. | 250/213 VT |
| 4,015,120 | 3/1977 | Cole | 250/216 |
| 4,282,527 | 8/1981 | Winderman et al. | 359/859 |
| 4,653,880 | 3/1987 | Sting et al. | 359/859 |
| 4,695,139 | 9/1987 | Bagby et al. | 359/859 |
| 4,863,253 | 9/1989 | Shafer et al. | 359/859 |
| 5,012,081 | 4/1991 | Jungwirth et al. | |
| 5,016,995 | 5/1991 | Pullen | 359/859 |

Primary Examiner—David C. Nelms
Assistant Examiner—Stephone B. Allen
Attorney, Agent, or Firm—John H. Kusmiss; Thomas H. Jones; Guy M. Miller

[57] ABSTRACT

A strip imaging wide angle optical system is provided. The optical system is provided with a "virtual" material stop to avoid aberrational effects inherent in wide angle optical systems. The optical system includes a spherical mirror section for receiving light from a 180-degree strip or arc of a target image. Light received by the spherical mirror section is reflected to a frustoconical mirror section for subsequent rereflection to a row of optical fibers. Each optical fiber transmits a portion of the received light to a detector. The optical system exploits the narrow cone of acceptance associated with optical fibers to substantially eliminate vignetting effects inherent in wide-angle systems. Further, the optical system exploits the narrow cone of acceptance of the optical fibers to substantially limit spherical aberration. The optical system is ideally suited for any application wherein a 180-degree strip image need be detected, and is particularly well adapted for use in hostile environments such as in planetary exploration.

15 Claims, 7 Drawing Sheets

5,266,795

WIDE-ANGLE IMAGING SYSTEM WITH FIBEROPTIC COMPONENTS PROVIDING ANGLE-DEPENDENT VIRTUAL MATERIAL STOPS

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The subject invention relates generally to a strip imaging optical system and, more particularly, to an imaging system having an arc-shaped spherical mirror section for receiving light from a wide angle strip of a target image and for reflecting the light into optical fibers for transmission to a detector.

BACKGROUND ART

In various applications, it is necessary to obtain strip images having a 180-degree field of view. Such applications include terrain mapping, oceanographic studies, planetary exploration, cloud surveillance, and aerosol bidirectional reflectance distribution measuring.

For such applications, a fish eye lens is often employed. However, a fish eye lens having a 180-degree field of view suffers from unacceptable levels of distortion and chromatic aberration. Further, such optical systems are often susceptible to thermal distortion caused by uneven expansion or contraction of components of the optical system.

Alternatively, a single narrow field of view optical device is rotated through 180 degrees to sequentially scan a full 180-degree field of view. The provision of a rotating optical device yields unacceptable penalties in weight, cost, and reliability. Further, such a device does not simultaneously image the entire 180-degree field of view and, therefore, is not suitable in circumstances where the image environment is changing rapidly, or in circumstances where the device itself is moving through the environment, such as on an aircraft, satellite, or remote space vehicle.

As can be appreciated, there exists a need for an improved strip imaging system capable of simultaneously imaging an entire 180-degree strip of a target image.

STATEMENT OF THE INVENTION

It is therefore an object of the present invention to provide an improved strip imaging optical system;

It is yet another object of the invention to provide a strip imaging optical system capable of simultaneously imaging a 180-degree field of view;

It is another object of the invention to provide a strip imaging optical system which has limited optical distortion;

It is another object of the invention to provide a strip imaging optical system which has limited chromatic aberration;

It is yet another object of the invention to provide a strip imaging optical system which has limited thermal distortion;

It is yet another object of the invention to provide a strip imaging optical system capable of being inexpensively constructed and reliably maintained;

It is a further object of the invention to provide a strip imaging optical system capable of being fabricated of metal in one or a few pieces by diamond turning;

It is yet another object of the invention to provide a strip imaging optical system having fiberoptic means for coupling to a detector array, spectrometer, or the like;

It is yet another object of the invention to provide a strip imaging optical system capable of a 180-degree field of view with 0.5-degree resolution of a bandpass extending from 500 to 1100 nanometers; and It is yet another object of the invention to provide a strip imaging optical system for use in coarsely monitoring the surroundings of a remote unmanned vehicle.

These and other objects and advantages of the present invention are achieved by providing an optical system having a wide angle imaging means for imaging an object and a virtual material stop means for eliminating aberrational effects of the wide angle imaging means.

In accordance with a preferred embodiment, the optical system includes an imaging means and a detector, with the imaging means dividing an image from an object into a plurality of image portions and allowing only image portions which coincide with predefined portions of acceptance to be detected by the detector.

Also in accordance with a preferred embodiment, an arc-shaped spherical mirror section is provided for receiving light along an optical plane from a wide angle strip image, providing the received light to a row of optical fibers and having the row of optical fibers transmitting the received light to a detector.

In accordance with the preferred embodiment of the invention, the optical system further includes a frustoconical mirror section for receiving the light reflected from the arc-shaped mirror section and then rereflecting the light so that it is incident into the row of optical fibers.

In the preferred embodiment, the arc-shaped mirror section and the frustoconical mirror section are both symmetric about an azimuthal axis of the system. Furthermore, the arc-shaped mirror section has a spherical reflecting surface with a center of curvature located on the azimuthal axis, and the arc-shaped mirror section is aligned along an optical plane perpendicular to the azimuthal axis. The arc-shaped mirror section is offset along the azimuthal axis from the center of curvature such that incoming light is not obstructed by the frustoconical mirror section.

The optical fibers are positioned closely adjacent to respective points along the frustoconical mirror section. Each optical fiber has a limited cone of acceptance such that only light received by the optical fiber within the limited cone of acceptance is internally transmitted within the optical fiber.

Preferably, the arc-shaped mirror section comprises a 180-degree arc for providing a 180-degree field of view. As a consequence of the limited cone of acceptance of these configured optical fibers, each optical fiber transmits only a portion of light initially received by the system. More specifically, each optical fiber is positioned along the frustoconical mirror section at its own respective azimuthal angle. Thus, each optical fiber transmits only light initially received by the system within a limited collimated beam passing through the azimuthal axis at the respective azimuthal angle of the respective optical fiber.

The preferred embodiment of the invention exploits the limited acceptance cone of the optic fibers to define, in effect, a virtual stop at the center of curvature of the spherical mirror for each fiber. Since a spherical mirror has no axis, no off-axis aberrations are present. Except for vignetting at the extremes of the 180-degree field of view, the portion of the incoming light received by any fiber is the same as the portion received by the fibers within the field of view. Since no material stop is needed, the optical system provides a 180-degree field of view, which would be difficult or impossible if a material stop needed to be placed in the optical path of the 180-degree spherical mirror section.

The preferred embodiment of the invention further exploits the fact that a spherical mirror has zero chromatic aberration. Thus, the wavelength range over which the invention is operable is limited only by the wavelength range over which optical fibers transmit light.

Thus, the combination of optic fibers having a limited cone of acceptance used with a 180-degree spherical mirror section, allows for panchromatic imaging of a 180-degree field of view hitherto impossible or impractical.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a strip imaging optical system.

Figure 1:
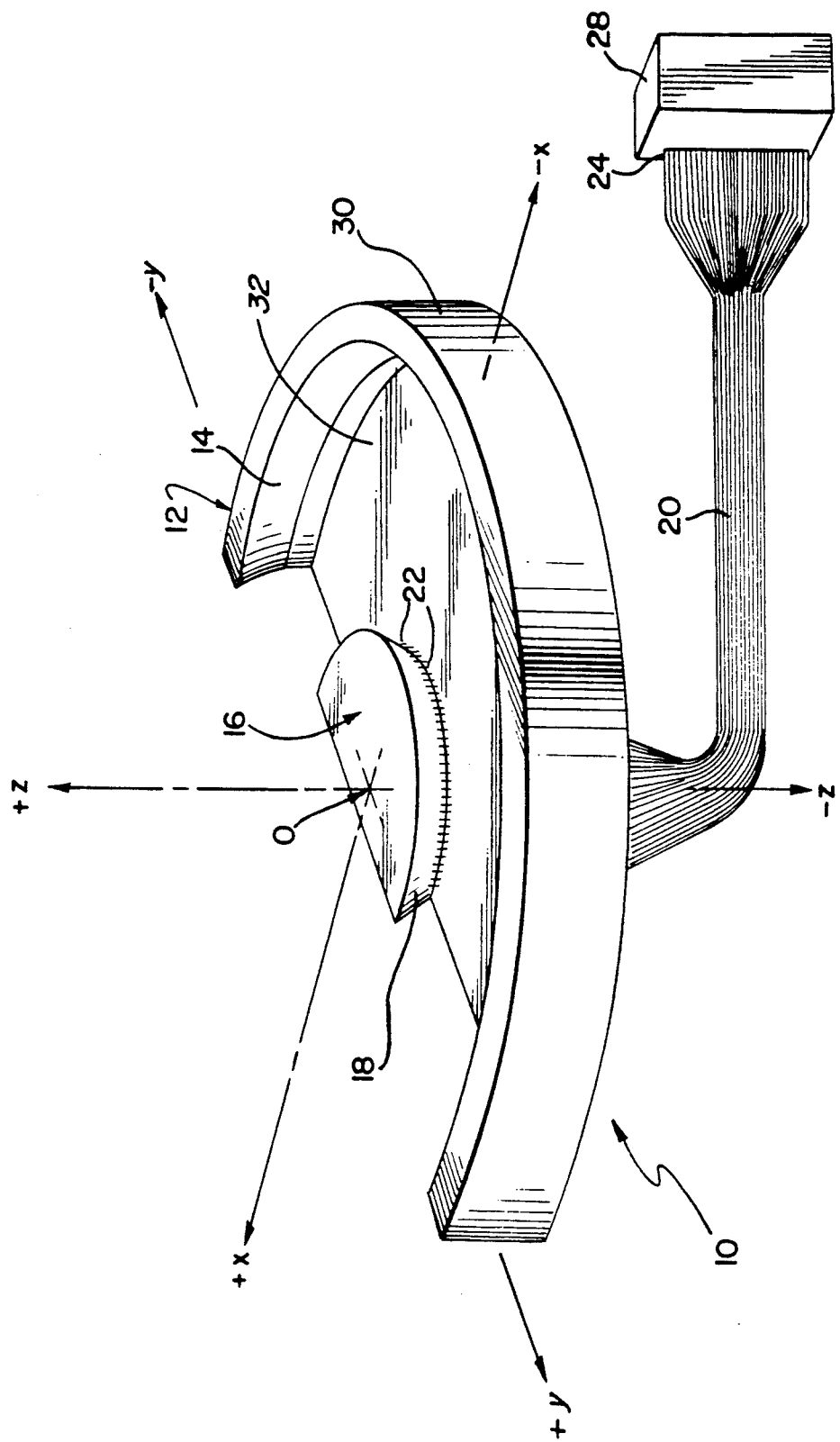
FIG. 1 is a perspective view, somewhat in schematic form, of a strip imaging optical system constructed in accordance with a preferred embodiment of the invention.
Figure 2:
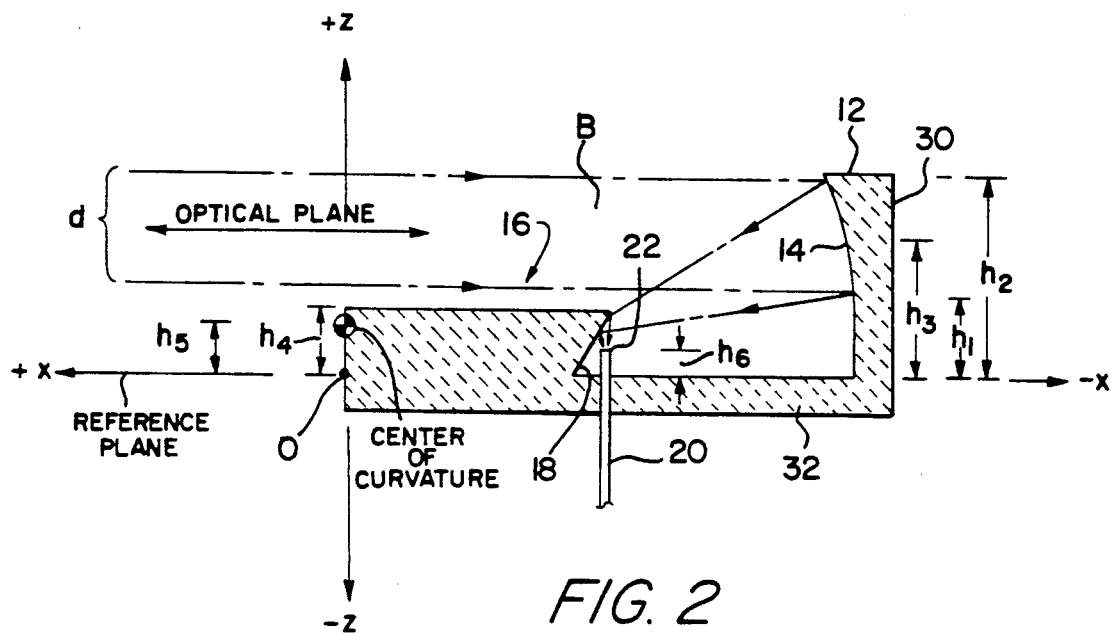
FIG. 2 is a side cross-sectional view of a portion of the optic system of FIG. 1, taken along the XZ plane of FIG. 1.

Referring to FIGS. 1 and 2, a strip imaging optical system 10, constructed in accordance with a preferred embodiment of the invention, is shown. Optical system 10 is described with reference to a Cartesian coordinate system XYZ having a horizontal or "reference" plane XY and a vertical or "azimuthal" axis Z.

In the preferred embodiment, optical system 10 includes a primary mirror element 12 having a reflecting surface 14. Reflecting surface 14 is a 180-degree section of a spherical mirror surface with the center of curvature located along azimuthal axis Z a distance $h_5$ from the reference plane. Reflecting surface 14 is defined by a 180-degree arc-shaped section of a sphere oriented along an "optical plane" parallel to the reference plane, but offset along the azimuthal axis Z by a distance $h_3$.

Reflecting surface 14 receives light from a 180-degree arc (not shown) of the optical plane. Thus, primary mirror element 12 receives light from a perspective strip of a target located generally along the positive X domain of the optical plane.

In the embodiment shown in FIG. 2, the light received by spherical reflecting surface 14 is reflected slantwise downward towards a secondary mirror element 16 having a generally frustoconical reflecting surface 18. By "frustoconical" it is meant that secondary mirror element 16 comprises a portion of a circular cone, and not a figure of revolution of a conical section such as a hyperbola, parabola, or ellipse.

Primary mirror element 12 is offset upward along the azimuthal Z-axis such that light received by primary mirror 12 is not obstructed by frustoconical mirror 16. Primary element 12 includes a rear surface 30.

As can be seen from FIG. 2, reflecting surface 18 of secondary mirror element 16 is angled with respect to the Z axis such that light reflected from primary mirror 12 toward secondary mirror 16 is rereflected vertically downward parallel to the azimuthal +Z axis.

Referring again to FIG. 1, a plurality of optical fibers 20 are positioned with receiving ends 22 adjacent reflecting surface 18 for receiving light reflected downwardly from reflecting surface 18. A single row of N such optical fibers are provided in an arc matching the 180-degree arc of reflecting surface 18. Each optic fiber 20 further includes an emitting end 24 positioned remote from secondary mirror element 16.

Frustoconical mirror 16 is provided to redirect the optical path of received light such that optical fibers 20 proximate the receiving ends 22 can be conveniently mounted.

As will be discussed below, each optical fiber 20 receives a portion of the light originally received and reflected by primary mirror element 12, then rereflected by secondary mirror element 16, and transmits the portion of light from receiving end 22 to emitting end 24 for subsequent detection.

In the embodiment shown in FIG. 1, emitting ends 24 of optical fibers 20 are aligned in a linear row for transmission of light onto a detector 28. Detector 28 can comprise any detector system suitable for detecting optical light such as, for example, a camera, photographic plate, CCD, spectrograph, or the like. As detector 28 is entirely conventional in design and use, it will not be described in further detail.

Figure 3:
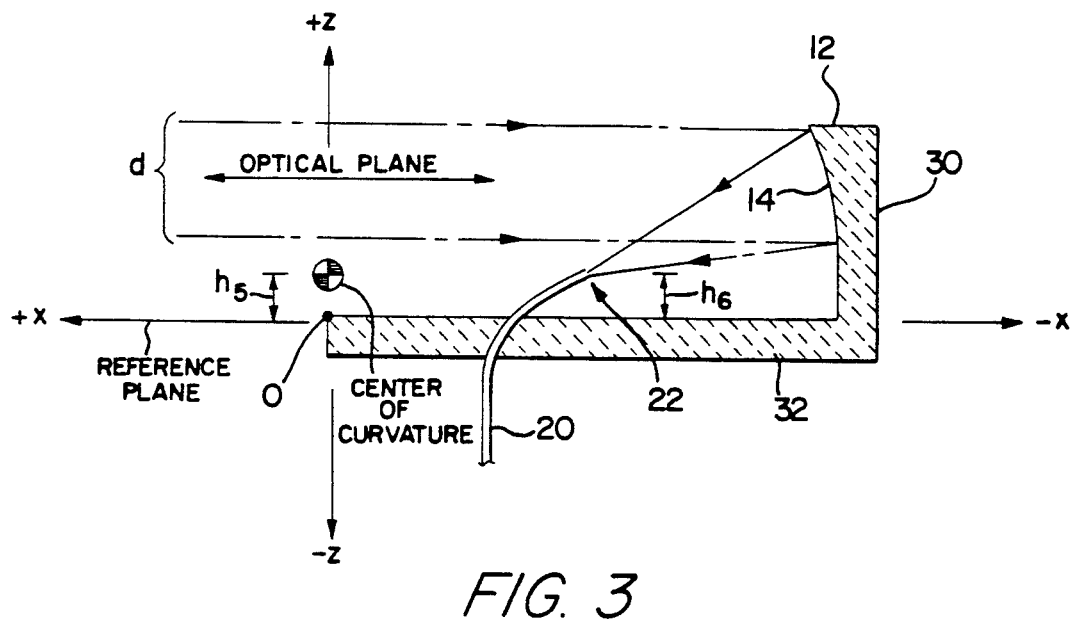
FIG. 3 is a side cross-sectional view of a portion of an alternative embodiment of the invention wherein no frustoconical mirror section is provided.

An alternative embodiment, also sharing advantages of the embodiment of FIGS. 1 and 2, is shown in FIG. 3. The embodiment of FIG. 3 is similar to the embodiment of FIG. 1, except that a secondary mirror element 16 is not provided. Rather, optical fibers 20 are positioned in a manner such that receiving ends 22 directly receive light reflected from primary mirror 12. This configuration has the advantage of not requiring fabrication of a secondary mirror 16, and also avoids any optical distortion produced by rereflection of light from frustoconical surface 18. However, without frustoconical mirror 16, the mounting of optical fibers 20 is less convenient, since the fibers are not oriented vertically but, rather, are oriented in the shape of a fan.

Figure 4:
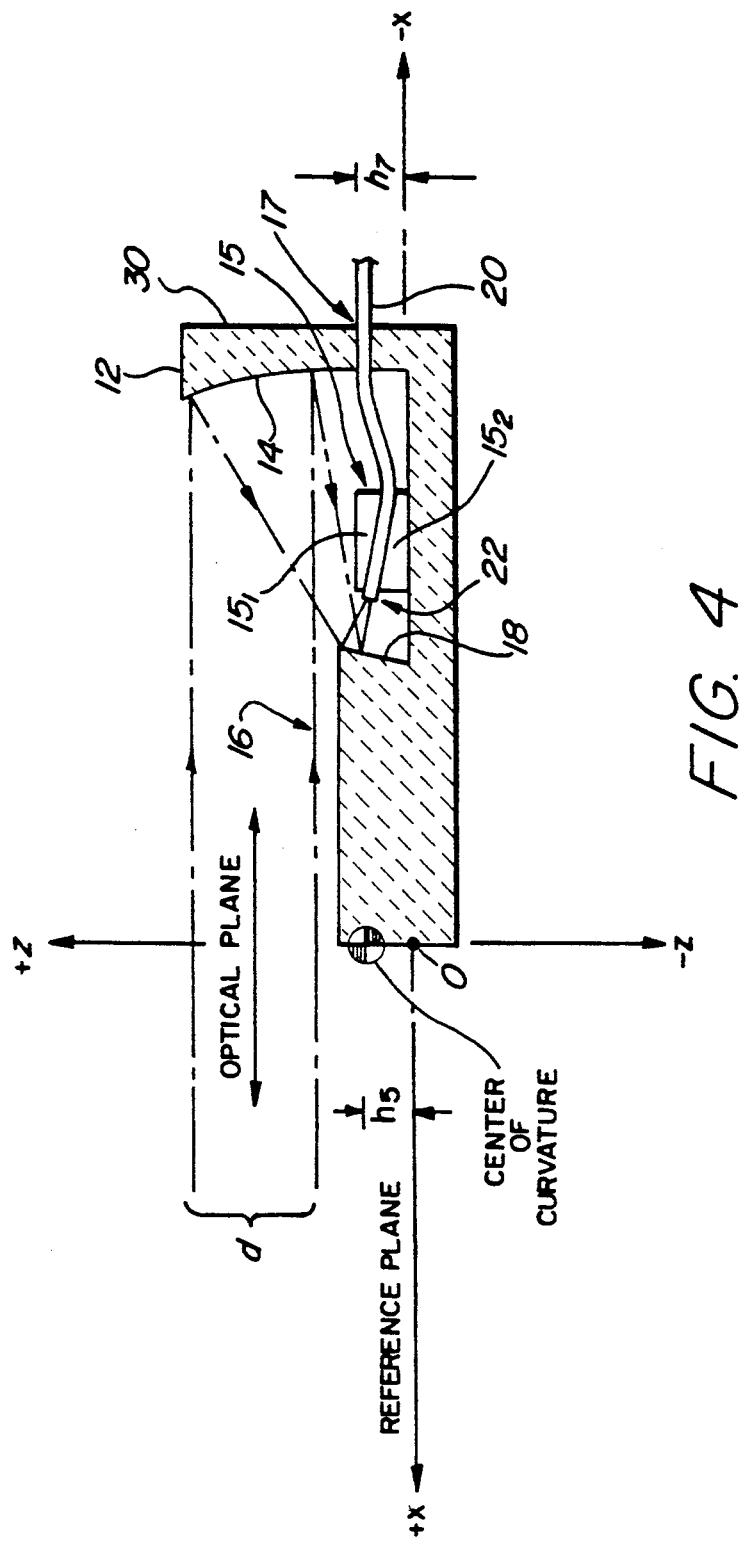
FIG. 4 is a side cross-sectional view of a portion of an alternative embodiment of FIG. 1 wherein an optical fiber clamping ring is provided.
Figure 5:
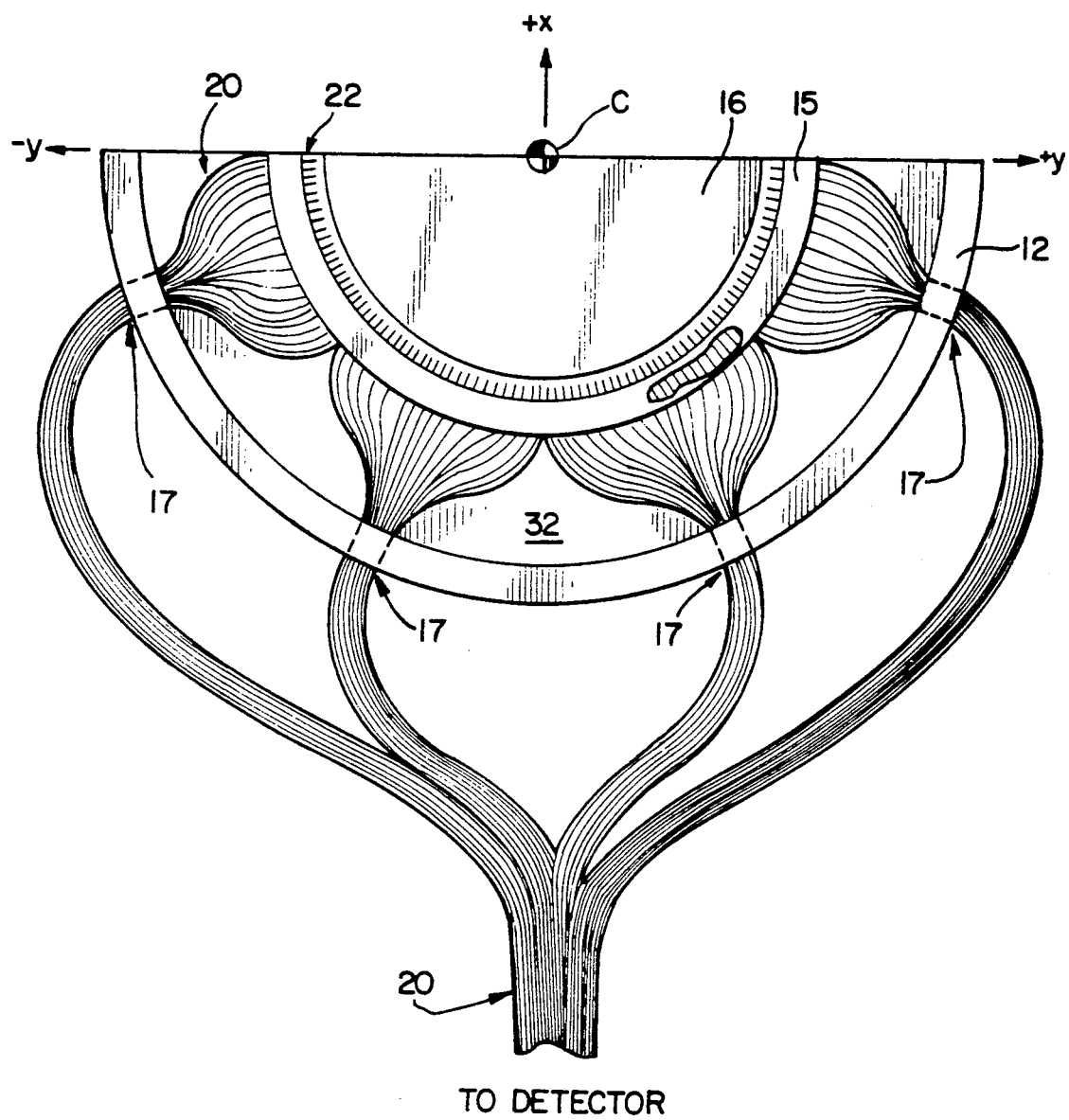
FIG. 5 is a top plan view of a portion of the embodiment of FIG. 4.

Another alternative embodiment of the invention is shown in FIGS. 4 and 5. The embodiment of FIGS. 4 and 5 is similar to the embodiment of FIG. 1 except that optical fibers 20 are mounted at an angle via a fiber clamping ring 15. Ring 15 includes separate upper and lower sections $15_1$ and $15_2$, respectively. Preferably, section $15_2$ is integrally formed with base 32.

A lower surface of section $15_1$ and an upper surface of section $15_2$ include complementary mating grooves such that, with section $15_1$ mounted onto section $15_2$, the complementary grooves combine to form a series of conduits for receiving optical fibers 20. The grooves form a radial pattern, shown in FIG. 5. In use, optical fibers 20 are positioned within the grooves of lower section $15_2$. Then, upper section $15_1$ is securely mounted to section $15_2$, thereby clamping optic fibers 20 into a diverging radial configuration with receiving ends 22 positioned in close proximity to reflecting surface 18 of frustoconical mirror 16. Preferably, upper section $15_1$ is cemented to lower section $15_2$.

A set of access holes, generally denoted 17, are formed in primary element 12 below reflecting surface 14. Access holes 17 allow optical fibers 20 to be connected from clamping ring 15 to detector unit 28. As can be seen from FIG. 5, each access hole 17 receives a bundle of optical fibers 20. The embodiment of FIGS. 4 and 5 has the advantage, over the embodiment of FIG. 1, in that only relatively few access holes 17 need be formed, rather than the large number of bore holes required in the embodiment of FIG. 1.

Although clamping ring 15 is shown mounting fibers 20 adjacent to frustoconical mirror 16, ring 15 can alternatively be used in the embodiment of FIG. 3 to mount fibers 20 to receive light directly from primary mirror 12.

Figure 6A:
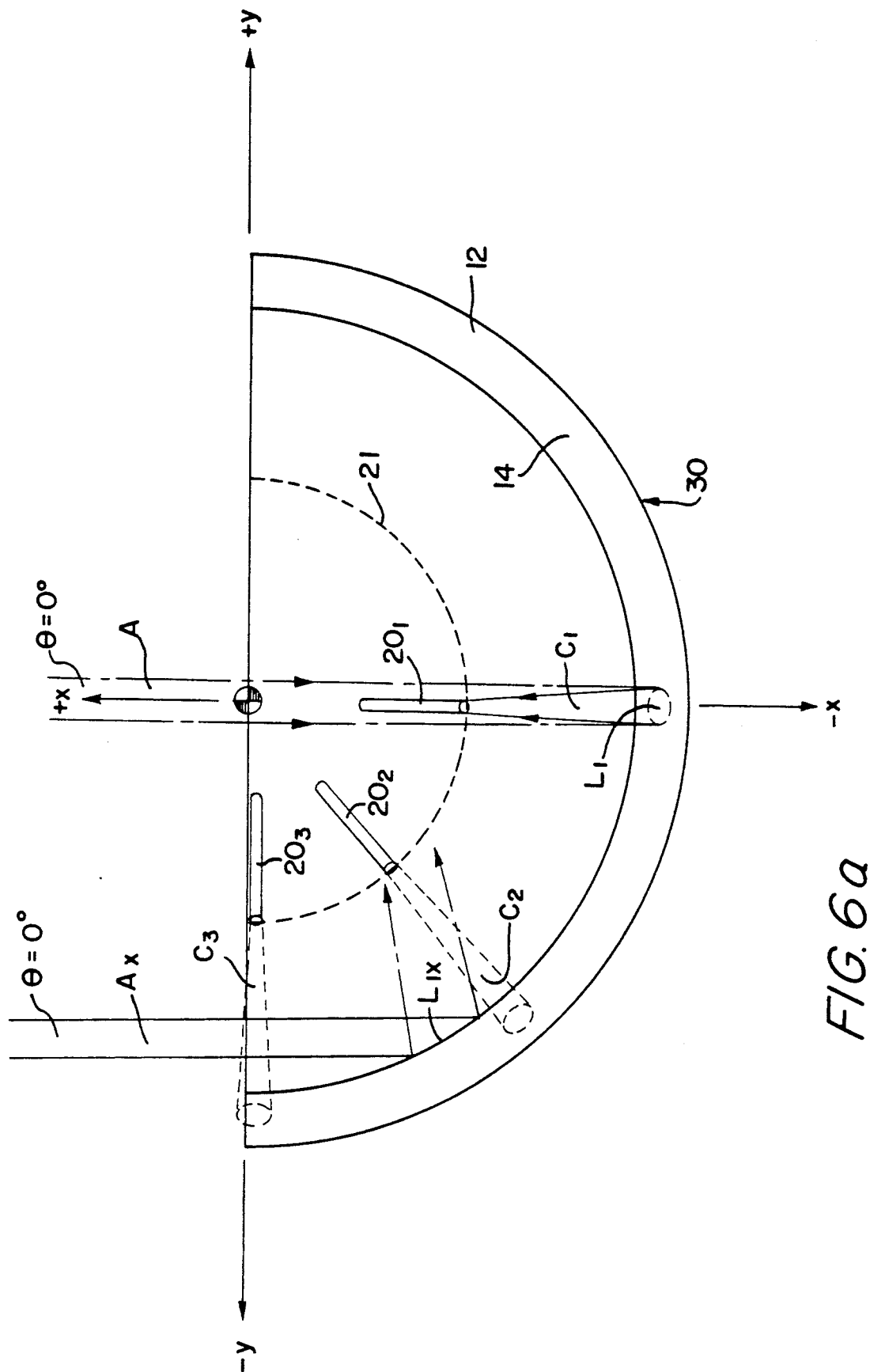
FIG. 6a is a top view of a portion of the optic system of FIG. 1 showing a pair of collimated beams of light entering the system.
Figure 6B:
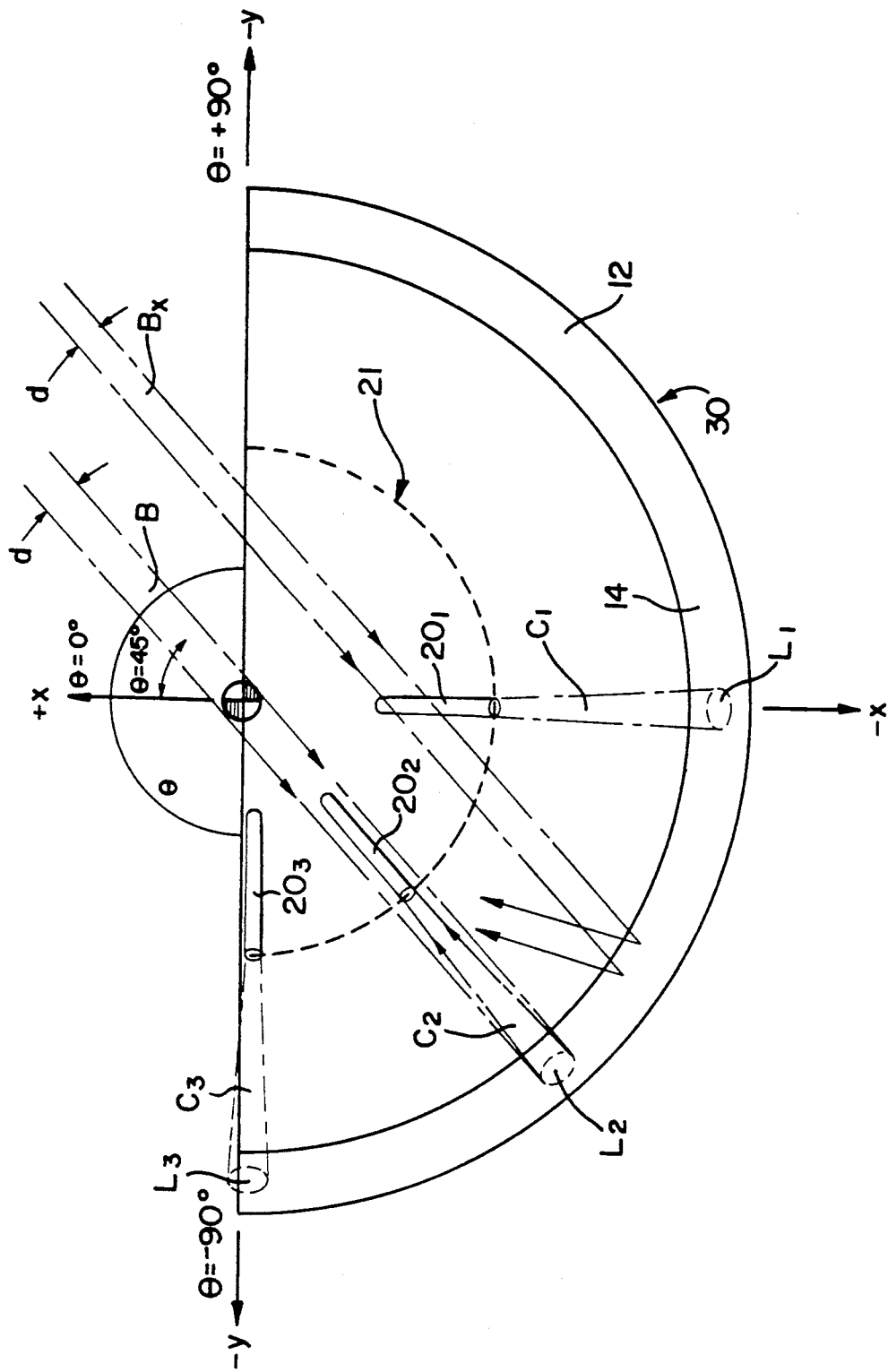
FIG. 6b is a top view of a portion of the optic system of FIG. 1 showing a pair of collimated beams of light entering the system at an angle.
Figure 6C:
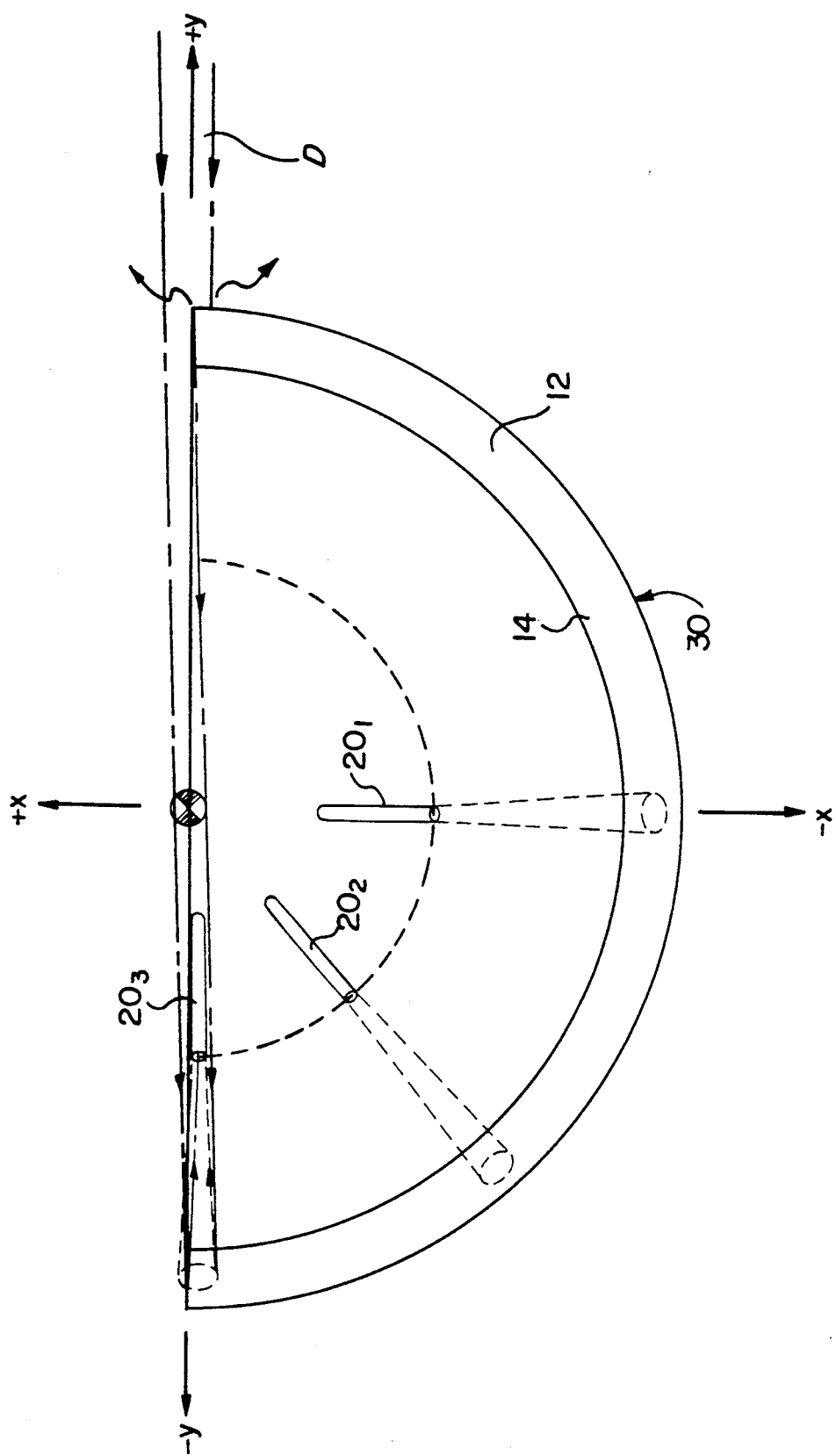
FIG. 6c is a top view of a portion of the optic system of FIG. 1 showing a single collimated beam of light entering the system.

Optical system 10 will now be described with reference to FIGS. 6a–6c. Shown therein are top elevational views of the embodiment of FIG. 3. For clarity only representative fibers $20_1$, $20_2$, and $20_3$ are shown in FIGS. 6a through 6c. Also provided are schematic representations of collimated beams of light entering the system parallel to the XY plane.

Each beam of light, represented in cross-section in FIGS. 6a–6c, is initially a column of light of diameter d. As shown in FIG. 2, an incoming beam is centered about the optical plane parallel to the reference XY plane, but offset along the Z axis by an amount $h_3$. As seen in FIGS. 6a–6c, the beams enter the system at various azimuthal angles $\Theta$ wherein the azimuthal angles $\Theta$ are defined as angles in the reference XY plane, with $\Theta=0$ being along the $+X$ axis.

As mentioned above, optical system 10 receives light from a 180-degree arc (not shown) generally centered on the optical plane from the direction of the $+X$ axis. A column of light received at a $\Theta$ angle greater than $+90$ degrees or less than $-90$ degrees strikes rear surface 30 of primary mirror 12 and, therefore, does not reach reflecting surface 14 for ultimate reflection and transmission to detector 28. Only columns of light received within a 180-degree arc centered on the $+X$ axis are reflected by surface 14.

However, being a wide angle mirror, reflecting surface 14 is affected by partial "vignetting," i.e., reflecting surface 14 presents a narrower reflecting cross-section to off-axis incoming light than to on-axis incoming light. In other words, reflecting surface 14 presents a smaller effective aperture for off-axis light than for on-axis light. It can be easily shown that off-axis light is vignetted by an amount $\cos(\Theta)$. This so-called "vignetting" effect is a serious problem in many wide-angle optical systems, but is almost completely eliminated in the present optical system by the provision and placement of optical fibers 20.

Each optical fiber 20 is aligned along a radius of the spherical reflecting surface 14, and each points towards a respectively unique location $L_1$, $L_2$, $L_3$ along reflecting surface 14. Each optical fiber 20 has a limited cone of acceptance C, represented by short dashed lines. Only light received within the respective cones of acceptance C is internally transmitted within optic fibers 20. Light received by optical fibers 20 at any angle greater than those contained within the cones of acceptance C are not internally reflected within the optical fibers, but leak out through the cladding of the fiber and do not reach emitting end 24 of the fiber. Each cone of acceptance C of optical fiber 20 intersects with reflecting surface 14 along a circular portion thereof.

Referring first to FIG. 6a, a cone of light A is received by optical system 10 within the optical plane at an azimuthal ($\Theta$) angle of zero. Column of light A passes directly through azimuthal axis Z, and is reflected by a portion $L_1$ of reflecting surface 14 and redirected towards optical fiber $20_1$. Since column of light A passes through azimuthal axis Z, the column is radially aligned with optical fiber $20_1$. Therefore, column of light A is reflected by reflecting surface 14 into the cone of acceptance of optical fiber $20_1$.

Column of light A is received by optical fiber $20_1$ at sufficiently shallow angles such that internal reflection within optical fiber $20_1$ is achieved. Column of light A is thereby received and transmitted by optical fiber $20_1$ for subsequent detection by detector 28.

Also shown in FIG. 6a is a second column of light $A_x$. Column $A_x$ also enters optical system 10 within the optical plane at an azimuthal angle ($\Theta$) of zero. However, unlike column A, column $A_x$ is offset along the $-Y$ axis and does not pass through azimuthal axis Z. Column of light $A_x$ is reflected by a portion $L_{1x}$ of reflecting surface 14 towards the optical fibers 20 including optical fiber $20_2$.

As can be seen from FIG. 6a, light rays within column $A_x$ are received by optical fiber $20_2$ at a steep angle. Thus, light from column $A_x$ is not received within the cone of acceptance $C_2$ of optic fiber $20_2$. Although rays of light within column $A_x$ may enter receiving end 22 of optic fiber $20_2$, such rays are not internally reflected within optic fiber $20_2$, and are not transmitted to detector 28. Further, although other rays within column $A_x$ may be received by other optic fibers (not shown) adjacent to optic fiber $20_2$, those rays are likewise received at angles too steep for internal reflection.

Of course, columns of light A and $A_x$ are merely representative of light entering optic system 10 parallel to the X axis. However, of all light received parallel to the X axis, only the light received within column A aligned with cone of acceptance $C_1$ is transmitted to detector 20 for detection. All other light rays received parallel to the X-axis, such as those contained within column $A_x$, are reflected by reflecting surface 14 at angles too steep for transmission by any optical fiber 20.

Referring now to FIG. 6b, a column of light B is shown entering optic system 10 at an azimuthal angle ($\Theta$) of approximately 45 degrees. As with the column of light shown in FIG. 2a, column B enters the system within the optical plane and reflects from a portion $L_2$ of reflecting surface 14. Column of light B passes through azimuthal axis Z along a radius of reflecting surface 14. Optical fiber $20_2$ is aligned along the same radius of reflecting surface 14 and has a cone of acceptance $C_2$ pointed towards reflecting surface 14. As can be seen from FIG. 6b, light received within column B is reflected from a portion $L_2$ of reflecting surface 14 towards optical fiber $20_2$ within the cone of acceptance $C_2$ of optic fiber $20_2$. Thus, light received within column B is internally transmitted within optic fiber $20_2$ for subsequent detection by detector 28.

Also shown within FIG. 6b is a second column of light $B_x$. As with column B, column $B_x$ enters optic system 10 along the optical plane at an azimuthal angle of approximately 45 degrees. However, column $B_x$ does not pass through azimuthal axis Z, but rather is offset along the positive Y axis.

Consequently, column $B_x$ is not aligned with a radius of reflecting surface 14. Therefore, although a portion of light within column $B_x$ is reflected towards optic fiber $20_2$, such light is received by optic fiber $20_2$ at a steep angle, and is not internally reflected for transmission to detector 28. The remainder of light rays received within column $B_x$ are reflected towards other optic fibers (not shown). However, such light is likewise received by the other optic fibers at angles too steep for internal reflection therein.

Consequently, of light received at an azimuthal angle of approximately 45 degrees, only light rays contained within a column passing through azimuthal axis Z are reflected into the cone of acceptance $C_2$ of optic fiber $20_2$ for ultimate detection by detector 28.

In general, an optic fiber $20_\Theta$, aligned along a radius $R_\Theta$ of reflecting surface 14 at an azimuthal angle of $\Theta$, will only receive and transmit light received by the system within a column passing through azimuthal axis Z at angle $\Theta$. No other light rays entering the system at an azimuthal angle $\Theta$ will be reflected for transmission within any optic fiber $20_\Theta$. Further, no light received by optic system 10 at any angle, other than $\Theta$ will be received and transmitted by optic fiber $20_\Theta$.

In other words, no light entering the system other than within columns passing through azimuthal axis Z, is detected by the system.

In the preferred embodiment, each optic fiber 20 is of the same size and composition, and thereby has the same angular cone of acceptance. Further, each optic fiber 20 is radially aligned along optical focus 21. Thus, although a greater proportion of light is received by the system parallel to the X axis than at an angle $\Theta$ from the X axis, each optic fiber $20_\Theta$ receives and transmits no more and no less of a proportion of light than any other optic fiber positioned at any other angle with respect to axis X. Assuming that an equal amount of light is received by system 10 at all angles, each optic fiber 20 receives and transmits an equal amount of light, regardless of its azimuthal angle. Since each optic fiber receives and transmits an equal amount of light, vignetting is substantially avoided.

It should be noted, however, that for columns of light received substantially parallel to the Y axis, a small amount of vignetting occurs. This is represented in FIG. 6c by a column of light D which is partly blocked or obscured by the rear surface 30 of primary mirror 12. Thus, light received almost parallel to the Y axis is partly obscured and optical fiber $20_3$ receives less light than optical fibers positioned further from the Y axis. The maximum amount of vignetting is 50% for those optical fibers adjacent to the Y axis at the extremes of the 180-degree field of view.

To briefly summarize, optical system 10 of the preferred embodiment exploits the narrow acceptance angle of optical fibers 20 to selectively illuminate a detector elements in accordance with the angle $\Theta$ at which the light bundle traverses the azimuthal axis Z.

Although the means by which the invention images a 180-degree field of view has been described with reference to an embodiment wherein no secondary frustoconical mirror is used, it should be readily understood that the same principles and conclusions apply to the embodiment having secondary frustoconical mirrors 16. The frustoconical reflecting surface 18 merely folds the cone of acceptance of each optic fiber such that the cone of acceptance extends toward the primary mirror 12 and intersects with reflecting surface 14 along a circular portion thereof.

Of course, conical surface 18 is positioned slightly closer to reflecting surface 14 than optical focus 21, such that light reflected from reflecting surface 14 does not reach a focus until after being subsequently reflected by conical surface 18 toward optical fibers 20. Thus, each optical fiber 20 is positioned at the effective optical focus and receives only light that enters the system in the optical plane and passes through the azimuthal axis Z, as with the embodiment of FIG. 3 previously described.

The limited cones of acceptance of optical fibers 20 are further exploited to minimize spherical aberration. Such aberration can be limited in nonwide-angle systems by providing a material stop at the center of curvature of the spherical reflecting surface.

A material stop typically comprises a plate through which a circular opening is provided. The plate is positioned at the center of curvature of a spherical mirror and blocks all light from entering the optical system other than through the circular opening. The material stop thus limits incoming light to a relatively narrow column. Spherical aberration is limited in such systems to the extent that only a limited portion of the spherical reflecting surface is utilized.

However, it is difficult, if not impossible, to provide a material stop within a wide angle optical system. Such a material stop would need to be located at the center of curvature of the spherical reflecting surface, and would need to simultaneously point toward the entire angular extend of the wide angle field of view. Thus, the material stop can only be successfully exploited for a narrow field of view optical system.

In the present system, however, the limited cones of acceptance of optic fibers 20 each provides a "virtual" material stop equivalent to an actual material stop located at the center of curvature and aligned with the optical fiber 20. The virtual stop is achieved because each individual optical fiber 20 transmits only light received through a relatively narrow column passing through the azimuthal axis of the system. Each optic fiber 20 "sees" an optical stop, allowing only a relatively narrow column of light into the system. Thus, each optic fiber 20 transmits light relatively free from spherical aberration.

Referring again to FIGS. 1 and 2, reflecting surface 14 is defined as a truncated spherical reflecting surface 14 having its center at the origin (O,O,O) of the coordinate system (X,Y,Z). The boundaries of the spherical reflecting surface 14 are defined by plane YZ, and by first and second planes (not shown) parallel to the XY axis. As shown in cross-section in FIG. 2, the usable portion of reflecting surface 14 is truncated along its bottom by a plane parallel to the XY axis, but offset therefrom by the amount $h_1$. Light reflected from a portion of reflecting surface below $h_1$ is not detected. Reflecting surface 14 is truncated at its top by a plane parallel to the XY axis, but offset therefrom by an amount $h_2$. Thus, reflecting surface 14 is a "frustospherical" section.

The height of the usable portion of reflecting surface 14 along the Z axis is represented by $h_2-h_1$, referred to hereinabove as the diameter d of light columns positioning the image.

Secondary mirror 16 is a frustoconical mirror having its axis along the Z axis and being truncated by the reference XY plane, by the ZY plane, and by a plane parallel to the XY plane, but offset therefrom by a height $h_4$. With $h_4$ less than $h_1$, secondary mirror 16 does not obscure light entering therefrom along the optical plane.

Primary mirror 12 and secondary mirror 16 are connected by a planar disc-shaped base plate 32. Optic fibers 20 are vertically secured within base plate 32 through bore holes taken vertically through plate 32.

Preferably, primary mirror 12, secondary mirror 16, and base plate 32 are integrally formed from one structural piece. Such can be accomplished by employing conventional diamond turning methods to machine a single piece of metal into the combination of primary mirror 12, secondary mirror 16, and base plate 32, shown in FIG. 1.

The optical parameters for optical system 10 of the preferred embodiment of the invention are shown in Table I.

TABLE I

R = Radius of curvature of spherical reflector 12.
w = linear diameter of optical fibers 20.
U = half angle of the cone of acceptance of optical fibers 20 as determined by the refractive indices of the core and cladding of the optical fibers.
SIN(U) = Numerical Aperture of optical fibers 20.
f = focal length of spherical reflector 12 = R/2.
d = 2 f SIN(U) = Effective diameter of the cone of acceptance at the distance f from the end of the fiber (i.e., the effective beam diameter at the spherical reflector).
β = angular extent of primary element 12 about center of curvature 0.

With reference to the parameters of Table I, optical properties and design constraints of optical system 10 will now be described. In particular, the angular resolution of system 10 will be calculated based on representative system parameters.

Generally, the maximum field of view of optical system 10 is realized for $\beta=180$ degrees ($\pi$ radians).

As noted above with reference to FIG. 6c, the field of view is slightly vignetted. For $\beta=180$ degrees, the unvignetted (unobscured) field of view is less than 180 degrees by the angle $d/R = d/(2f) = SIN(U)$ radians (assuming $SIN(U)<<1$). For a typical optical fiber: $SIN(U) \approx 0.1$. Hence, the remaining unvignetted field of view is approximately $\pi - 0.1$ radians or 174 degrees. Thus, the useable field of view extends to 180 degrees with some vignetting (maximum 50%) at azimuthal angles Θ near ±90 degrees.

With regard to the embodiment of FIG. 3, if the fibers 20 are not to obstruct an incoming collimated beam of diameter d, spherical mirror 12 must be offset by a distance $h_3$ of at least d/2, and must have a thickness $h_2-h_1$ of at least d.

With regard to the embodiment of FIGS. 1 and 2, offset $h_3$ must be greater than d/2, to allow for the necessary thickness of frustoconical mirror 16. This additional offset $h_4$ is preferably kept comparable to the thickness of fibers 20. It should be noted that in FIG. 2, for clarity, offset $h_4$ is shown in exaggerated size.

In each of the embodiments of FIGS. 2, 3, and 4, the center of curvature of reflecting surface 14 is located along the azimuthal axis at a height $h_5$ above the reference XY plane.

In the embodiment of FIG. 3, receiving end 22 of optical fiber 20 is positioned at height $h_5$ above the reference XY plane at a distance R from the center of curvature. Thus positioned, receiving end 22 is located at the optical focus of reflecting surface 14. Of course, there are N such fibers located at various azimuthal angles.

In the embodiment of FIG. 2, frustoconical mirror 16 folds the optical path such that receiving ends 22 are located at the effective optical focus rather than at the "actual" optical focus. Thus, in the embodiment of FIG. 2, receiving end 22 is located at a height $h_6$, which is somewhat less than $h_5$. The angle of conical reflecting surface 18 necessary to reflect received light downward parallel to the Z-axis is readily calculable from optical principles.

In the embodiment of FIG. 4, receiving ends 22 are likewise positioned at the "effective" optical focus of the system. However, frustoconical surface 18 is angled such that light is reflected radially outward rather than vertically downward. Thus, receiving ends 22 are positioned at a height, identified as $h_7$, which is somewhat different than $h_6$ of FIG. 2.

The angle of conical surface 18 needed to reflect received light into the thus-positioned optical fibers 20 is readily calculable from basic optical principles.

For all three embodiments shown above, the maximum number of fibers 20 that can be positioned along the perimeter of the optical focus 21 is represented by $N = \pi f / w = \pi R / 2w$.

A sampling interval $\alpha_o$ is represented by $\pi/N$ (radians) or 180/N (degrees). For practical purposes, sampling interval $\alpha_o$ is equivalent to the smallest, i.e. best, angular resolution achievable with N fibers arranged along a 180-degree arc.

In principle, sampling interval $\alpha_o$, i.e. the angular resolution, can be made as small as desired by either choosing sufficiently narrow fibers or by choosing a sufficiently large spherical radius of curvature of surface 14. However, in practice, the achievable resolution is limited by uncorrected spherical aberration of spherical mirror 14.

Since optical system 10 does not include a corrector lens, the angular diameter, in radians, of the least circle of confusion of mirror 12, is represented by the formula $\alpha_{sph} = (1/32)[k \cdot SIN(U)]^2$.

This formula, with $k=1$, is generally applicable to a spherical mirror having a circular aperture centered on a chief ray. However, as noted above, the effective circular aperture of mirror 12 is decentered by at least d/2. Consequently, the actual aperture is, in effect, a portion of a circular aperture of diameter 2d. The spherical aberration of the decentered aperture is therefore greater than that of a centered aperture of diameter d. Therefore, a portion of initially collimated light rays is aberrated by as much as the marginal rays of an aperture of diameter 2d. Thus, to obtain an approximate but conservative estimate of the influence of spherical aberration upon the resolution of system 10, a value of $k=2$ is reasonable.

If the resolution of system 10 is not to be degraded by spherical aberration of mirror 12, the geometry of system 10 must satisfy the condition $$\alpha_{sph} < \alpha_o,$$

from which it follows that $$N = 32 \pi/[k \cdot SIN(U)]^2. \quad \text{Eq. 1}$$

The following two examples illustrate the application of the foregoing equation in the case of fiber 20 of diameter 10 and 200 microns, respectively.

EXAMPLE 1

| | |
|---|---|
| Assuming | $SIN(U) = 0.1$ with $k = 2$ |
| | $w = 0.010$ MM |
| Then | $N = 2513$ (from Eq. 1) |
| | $\alpha_o = 0.072$ degrees $= 4.3$ arc minutes |
| | $R = Nw/\pi = 8$ MM |
| | $d = R \, SIN(U) = 0.8$ MM |

EXAMPLE 2

| | |
|---|---|
| Assuming | $SIN(U) = 0.1$ with $k = 2$ |
| | $w = 0.200$ MM |
| Then | $N = 2513$ (from Eq. 1) |
| | $\alpha_o = 0.072$ degrees $= 4.3$ arc minutes |
| | $R = Nw/\pi = 160$ MM |
| | $d = R \, SIN(U) = 16$ MM |

Examples 1 and 2 show that an angular resolution approaching that of the human eye, i.e. 1 arc minute, is possible in principle with system 10, and that, with conventional optical fibers, the overall diameter of the mirror section 12 preferably ranges from 16 MM to 32 CM.

In many applications, the best possible angular resolution need not be attained. In such cases fewer than the number of fibers calculated from Eq. 1 need be used, or, alternatively, fibers of diameter larger than the circle of least confusion imposed by spherical aberration can be employed.

In practice, the actual Numerical Aperture of optic fibers 20 used may be different from the value SIN(U)=0.1 provided in the foregoing examples.

Thus, the optical system shown in FIGS. 1 and 2 provides a strip imaging optical system capable of imaging a 180-degree strip of a target image without vignetting and without chromatic aberration to a resolution equal to that of the human eye.

In either embodiment, all reflecting optical components are preferably constructed of aluminum with reflecting surfaces thereof provided by a diamond turning machine. By using aluminum for the optical components, the system is substantially athermal, i.e., the optical components are relatively immune to distortion caused by uneven heating or cooling. Therefore, the optical system can be constructed at room temperature and reliably operated in environments where the temperature is either fairly in excess or substantially below room temperature. Aluminum has the further advantage of being relatively inexpensive.

Of course, as will be understood by those skilled in the art, any suitable composition can be used for constructing the optical components, including other metals, glass, crystal, etc. Also, as will be understood by those skilled in the art, frustoconical reflecting element 18 can be replaced by a plurality of planar faceted reflecting elements, likewise positioned to receive light reflected from primary element 12 and reflect the light into optical fibers 20. A secondary mirror element comprising planar facets has the advantage of substantially eliminating any distortion caused by the frustoconical surface. Likewise, optical fibers 20 can be replaced by any optical transmission means having a limited cone of acceptance, to thereby produce the virtual optical stop discussed above.

The optical systems thus far described are ideally suited for any application wherein a 180-degree strip of a target image must be detected. Further, two such optical devices can be mounted piggyback and aligned in opposing directions such that an entire 360-degree field of view is simultaneously detected. As calculated above, the resolution of optical system 10 of the preferred embodiment can, with conventional optical fibers, achieve a resolution equal to that of the human eye, and can therefore be used in any application where such resolution is sufficient.

In use, optical system 10 can be rotated about the Y axis such that the entire spherical field of view in all directions is sequentially image, scanned, or otherwise detected. Alternatively, optical system 10 can be moved horizontally above a terrain to thereby sequentially image or detect a broad surface of the terrain, with each element of the image comprising a 180-degree strip of the terrain from horizon to horizon.

Finally, optical system 10 is particularly well suited to planetary exploration because of its small size and reliable components.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A wide-angle strip-imaging optical system comprising:
   a first mirror having a circular periphery and a cross-section which is an arc of a spherical reflecting surface said first mirror being positioned to receive and reflect light from a wide-angle strip of a target image;
   a plurality of optical fibers for receiving and transmitting light to a detector means for detecting the target image; and a second mirror having a frustoconical cross-section for receiving light reflected from said first mirror and for re-reflecting said light into said plurality of optical fibers.

2. The strip-imaging optical system of claim 1, wherein said plurality of optical fibers have receiving ends positioned in close proximity to respective points along said frustoconical cross-section.

3. The strip-imaging optical system of claim 1, wherein said cross-section of said first mirror and said frustoconical cross-section are generally symmetric about an azimuthal axis extending through a center of curvature of the spherical reflecting surface, and wherein the bottom edge of said cross-section of said first mirror lies on an optical plane, said optical plane being perpendicular to said azimuthal axis and offset along the azimuthal axis from said center of curvature.

4. The strip-imaging optical system of claim 3, wherein said optical fibers are oriented along respective azimuthal angles about said azimuthal axis, and wherein each respective optical fiber transmits only light initially received by the system within a collimated beam passing through the azimuthal axis of the system at the azimuthal angle of the respective optical fiber.

5. The system of claim 1, wherein said system further includes a base plate, with said first mirror, said second mirror, and the receiving ends of said optical fibers being mounted to said base plate.

6. The system of claim 1, wherein said optical fibers have receiving ends mounted in close proximity to the frustoconical reflecting surface of said second mirror, said fibers being mounted by a fiber clamping ring.

7. The system of claim 6, wherein said optical fibers are mounted in a converging fan configuration.

8. A strip-imaging optical system for receiving and detecting a strip of a target image, said strip being oriented along an optical plane of the system perpendicular to an azimuthal axis of the system, said system comprising:
a wide-angle primary mirror for receiving and reflecting light from the target image, said primary mirror having a circular periphery and a spherical reflecting surface comprising a generally arc-shaped section of a sphere aligned along the optical plane, said arc-shaped section having a center of curvature located on an azimuthal axis perpendicular to said optical plane, said optical plane being offset along the azimuthal axis from the center of the curvature;
a plurality of optical fiber means located within the periphery of said primary mirror and positioned at respective azimuthal angles along respective radii of said spherical reflecting surface for receiving light reflected from said spherical reflecting surface and for transmitting the received light to a detector means for detecting the light;
each of said optical fiber means having a limited cone of acceptance for receiving and transmitting only light received by the system within a respective collimated beam entering the system through the azimuthal axis of the system at the respective azimuthal angle of the respective optical fiber means such that each fiber means transmits an equal amount of light regardless of its azimuthal angle such that vignetting by said wide-angle primary mirror is minimized.

9. The system of claim 8, wherein said optical fibers have receiving ends positioned along an arc of optical focus of the spherical reflecting surface.

10. The system of claim 8, wherein said receiving ends of said optical fibers are aligned in the form of a cone having an axis along the azimuthal axis of the system.

11. The system of claim 8, wherein the circular periphery of the arc-shaped mirror section extends through 180 degrees for providing a 180-degree field of view.

12. A strip imaging optical system comprising:
a base plate having a top surface;
a primary mirror comprising a 180-degree circular section of a concave spherical mirror, said section being defined by the intersection with a concave spherical surface of first and second spaced-apart parallel planes, said first plane being parallel to the plane of the top surface of said base plate and lying a distance $h_1$ above said base plate, said second plane lying at a distance $h_2$ above the plane of the top surface of said base plate, $h_2$ being greater than $h_1$;
a support wall of height $h_1$ attached to and holding said primary mirror above said base plate;
a second mirror connected to said base plate and located by said plate within the circumference of said primary mirror, the surface of said second mirror lying generally opposite and below that of said primary mirror and having a reflecting surface defined by a 180-degree section of the outer surface of a circular cone which has an axis perpendicular to said first plane and lies between the plane of the top surface of said base plate and a third plane parallel thereto;
said third plane lying at a height $h_4$ above the plane of said base plate, $h_4$ being less than $h_1$;
a plurality of optical fibers arranged around the reflecting surface of said second mirror and in position to receive light reflected off said reflecting surface; and
a detector means for receiving light from said plurality of optical fibers.

13. The apparatus of claim 12 wherein said primary mirror, said secondary mirror, said base plate, and said support wall comprise an integrally-formed, single, rigid structural piece.

14. The apparatus of claim 12 wherein said primary mirror, said secondary mirror, said base plate, and said support wall comprise an integrally-formed, single, rigid structural piece.

15. A strip imaging optical system comprising:
a base plate having a top surface;
a wide-angle primary mirror comprising a 180-degree circular section of a concave spherical mirror, said section being defined by the intersection with a concave spherical surface of first and second spaced-apart parallel planes, said first plane being parallel to the plane of the top surface of said base plate and lying a distance $h_1$ above said base plate, said second plane lying at a distance $h_2$ above the plane of the top surface of said base plate, $h_2$ being greater than $h_1$;
a support wall of height $h_1$ attached to and holding said primary mirror above said base plate;
a plurality of optical means located within the periphery of said primary mirror and aligned along respective radii of said spherical reflecting surface for receiving light reflected from said spherical surface and for transmitting the received light to a detector means for detecting the light;

each of said optical means having a limited cone of acceptance for receiving and transmitting only light received by the system within a respective collimated beam entering the system at the respective angle of the respective optical means such that each optical means transmits an equal amount of light regardless of which respective radii it is aligned with, such that vignetting by said wide-angle primary mirror is minimized.

* * * * *